United States Patent
De Leon

(10) Patent No.: US 7,255,264 B2
(45) Date of Patent: Aug. 14, 2007

(54) CELLULAR PHONE-BASED AUTOMATIC PAYMENT SYSTEM

(76) Inventor: Hilary Laing De Leon, U2403 One San Miguel Ave. Bldg. San Miguel Ave., cor Shaw Blvd., Pasig (PH) 1605

( * ) Notice: Subject to any disclaimer, the term of this patent is extended or adjusted under 35 U.S.C. 154(b) by 6 days.

(21) Appl. No.: 11/099,125

(22) Filed: Apr. 5, 2005

(65) Prior Publication Data
US 2005/0238149 A1 Oct. 27, 2005

Related U.S. Application Data

(60) Provisional application No. 60/565,507, filed on Apr. 24, 2004.

(51) Int. Cl.
*G06F 17/00* (2006.01)
*G06F 7/08* (2006.01)
*G06K 5/00* (2006.01)
(52) U.S. Cl. ......................... 235/375; 235/380; 235/381
(58) Field of Classification Search ........ 235/379–381, 235/492, 375
See application file for complete search history.

(56) References Cited

U.S. PATENT DOCUMENTS

2002/0066042 A1* 5/2002 Matsumoto et al. ........ 713/202

* cited by examiner

*Primary Examiner*—Daniel Walsh
*Assistant Examiner*—April A. Taylor

(57) ABSTRACT

A wireless payment system allows high speed operation without user intervention with the convenience that cellular phones provide. The system being described uses a wireless stored value module attached to an ordinary cellular phone or embedded in the cellphone's Subscriber Identity Module (SIM) card. A Reader is installed in points of transaction that communicates with the module and deducts the balance stored in the module for effecting the payment. The transaction is sent by the Reader to a central database to update a copy of the module's balance and perform settlement functions at the end of the day. After every transaction, a SMS or text confirmation is received by the cellphone user which indicates the amount paid and remaining balance in the module. Re-loading of values in the module can be accomplished solely by sending text messages using a cellular phone from anywhere, any time.

8 Claims, 12 Drawing Sheets

Approx. Dimension: 30 mm dia
1.5 mm Thickness

CELLULAR PHONE-BASED AUTOMATIC PAYMENT SYSTEM

CROSS REFERENCE TO RELATED APPLICATIONS

This application claims the benefit of Provisional Patent Application No. 60/565,507, filed Apr. 24, 2004.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention relates to the use of radio frequency (RF) identification technology in the area of automatic payment systems. Stored value contactless cards with RF and memory chips is a popular method for implementing high speed, low value payment systems. These are particularly true for mass transit systems, tollways and bus systems where the payment transaction has to be completed in a matter of seconds. In the case of train systems, plastic contactless smart cards are normally used, while for tollways, vehicle-mounted transponders or tags are used for non-stop electronic payments. The value in these cards or tags are replenished or re-loaded by going to a reloading station or outlet such as a customer service center, a vending machine or a retail shop where the customer pays by cash or by credit card and presents his card or tag.

Cellular phones are also being used for making payments, whereby the customer enrolls first for the payment service and then every time a payment has to be made, the customer sends a text message consisting of a security code, the amount to be paid and other pertinent data to a special access number. This method is suitable for making purchases for goods in retail shops or malls and paying for services where the speed of the transaction is not critical.

The invention being described combines the speed of RF ID technology and the proliferation and convenience of cellular phones. It capitalizes on the fact that there are hundreds of millions of cellphone users worldwide and whether the person is driving a car, riding a train or shopping in a mall, he always has his cellphone with him. It is a fast way of making payments because there is no need to send text messages. In mass transit systems, the cellphone is simply waved on a Reader located on top of the gate. In tollways, the customer drives through the toll plaza and as long as the cellphone is located within the driver's area it will be automatically sensed by a Reader installed on the side of the toll booth. For retail payments such as in fastfood outlets, the cellphone is simply waved on the Reader located near the store's cashier or Point-of-Sale terminal. No user intervention is needed.

The RF ID chip with memory is either in the form of a thin flat module which is attached to the back of the cellphone or embedded in the SIM card inside the cellphone. To re-load the chip or module, the user simply sends a text message to a special access number, specifying the amount to be loaded and his security code.

With this system, re-loading is very convenient because it can be accomplished anytime from anywhere. The balance in the chip can be checked any time by simply sending a text request. The module has multiple uses. It can be used in tollways, mass transit systems, fastfood outlets, cinemas, concerts and convenience shops. The infrastructure needed to support it is inexpensive, especially as compared to tollways where the cost of Readers for Toll Collection Tags are very high. In the case of train systems, there is no need for expensive vending machines or cash-based loading outlets at the train stations since re-loading can be done completely on the cellphone.

Research on the prior art listed below either require use of texting for completing the transaction or does not use RF ID technology:

US20030078895 Use of Cellular Phones for Payment of Vending Machines—MacKay, George WO04023366A1 System for Electronically Settling by Using Mobile Phone & Method Thereof—Kim, Chong-Ki US20030022655 System and Method for Implementing Financial Transactions using Cellular Phone Data—Bogat, Antonio U.S. Pat. No. 6,535,726 Cellular Telephone-based Transaction Processing—Johnson, William JP2001042017A2 Payment Method using Cellular Phone—Ikehara, Horoharu JP2001243513A2 Method and Device for Automatic Payment of Toll Highway Fare using Cellular Phone—Ishihara Isao et al US20040263356 Automatic Car Toll Paying Method—Wu, Quen Zong et al US20040107170 Apparatus for Purchasing of Goods and Services—Labrou, Yannis et al

BRIEF SUMMARY OF THE INVENTION

Electronic payment systems for tollways, carparks, train systems and similar applications require high speed performance and fully automatic operation without the need for intervention by the customer. Contactless smart cards require presenting the card to a Reader while Electronic Toll Collection tags are expensive and applicable only to tollways and carparks. This invention being described uses an ordinary GSM cellphone for achieving fully automatic payment capability without the need for customer intervention and an expensive infrastructure. It can easily be deployed because cellphones now are the most commonly found electronic device today, with hundreds of millions of users worldwide. It can be used for tollways, carparks, train systems, fast food outlets, retail stores, theaters and similar applications which require fully automatic high speed payment of small amounts.

It operates through the use of an electronic wireless module which has a monetary value stored in its memory. The module is either externally attached to the cellphone or embedded in it. At the point of transaction, a Reader communicates with the module and deducts the amount to be paid from the balance stored in the module. The transaction is sent to a central or back-end processing facility and the customer receives a confirmation by text or SMS of the amount paid and the balance left in the module. Reloading of the stored value in the module can also be accomplished through the cellphone by sending SMS instructions to the back-end facility. Hence, reloading can be accomplished from anywhere, at any time without having to go to a reloading outlet.

BRIEF DESCRIPTION OF DRAWINGS

FIG. 2 is the RF Module Block Diagram where FIG. 7 is a Flow Chart of a Typical Transaction in a Toll Collection Application, where

DETAILED DESCRIPTION OF THE INVENTION

Figure 1:
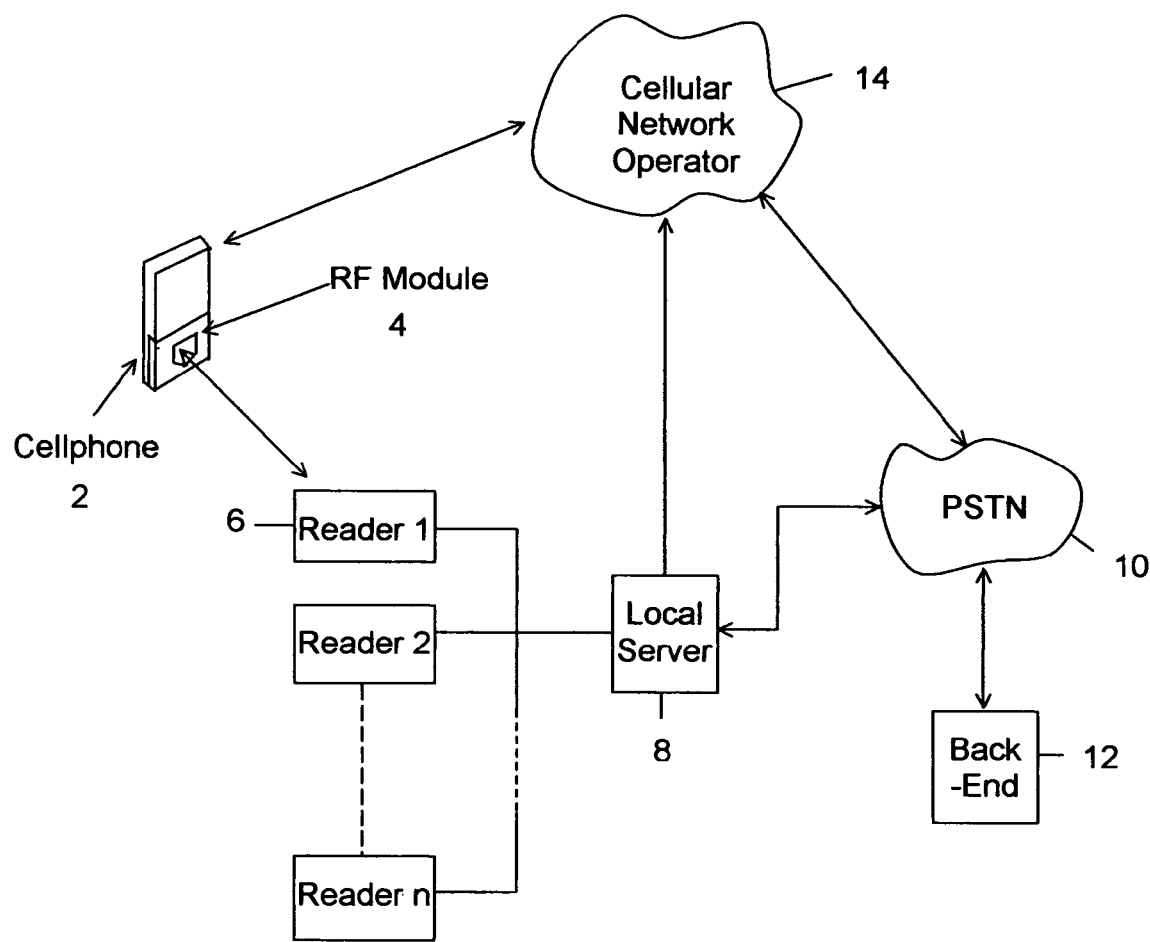
FIG. 1 is the Block Diagram of the Cellular Phone-based Automatic Payment System.

A block diagram of the system is shown in FIG. 1. A Radio Frequency module 4 attached to the back of the cellphone 2 communicates with a Reader 6 at the point of transaction. The module carries the customer ID and contains the stored value which is debited to serve as the payment for the transaction. The Reader 6 automatically senses the presence of module 4 and when detected it checks if the module ID is valid and then sends the amount to be deducted from the module's balance. The transaction is sent by the Reader to a local server 8 which stores the transaction in its own database and then sends it to the Back-end processing facility 12 either through a GSM/GPRS connection to the Cellular Network 14 or the regular Public Switched Telephone Network (PSTN) 10. At the back-end 12 a database of the balance in the customer's module is maintained and this is updated every transaction so that it is always synchronized with the module balance. The back-end 12 then sends through the Cellular Network 14 a SMS message to the customer's cellphone 2 notifying the customer of the amount paid, the nature of transaction and the remaining balance on the module. During the whole operation the customer doesn't have to press anything on the cellphone 2. The module-Reader communications cycle can be completed within one second or less. A few seconds later, the customer gets the SMS from the network confirming the transaction.

For locations without an on-line connection to the back-end 12, the local server 8 or the reader 6 itself sends a confirmation of the transaction directly to the customer through the Cellular Network 8 and updates the back-end facility 12 in batch mode on a regular basis using a dial-up connection or data transfer through GSM or GPRS.

At the back-end facility 12, a database server records all the transactions and keeps track of the activity of every module 4. This is also where instructions are generated for banks to electronically transfer funds between the various parties involved in the payment system at the end of each day. Reports for management, accounting, customer statements of account, settlement and reconciliation are also generated.

Figure 2A:
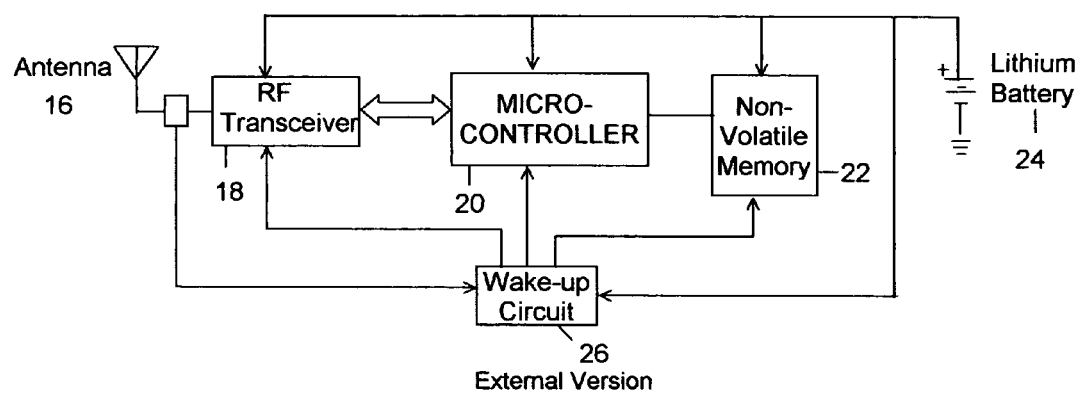
FIG. 2A is the External Version.

The RF module's operation of the external version is illustrated by the block diagram shown in FIG. 2A. Since the module is equipped with its own battery 24, its idle condition should not consume too much power so as to prolong the life of the battery. A battery life of 4 to 5 years should be attainable. Because of this, the circuit is normally shut off when idle and only a wake-up circuit 26 consuming a few microamperes is running. When this circuit senses an RF signal from the Reader 6 through the antenna 16 it signals the RF Transceiver 18 and the microcontroller 20 to turn on and start communicating with the Reader 6. All data including customer ID, security keys and stored value balance are stored in the non-volatile memory 22. For purposes of security, data is stored and communicated in encrypted form using a highly secure algorithm. The modulation method used is direct sequence spread spectrum to allow operations in noisy environments and for immunity to interference. The authentication procedure shall conform to ISO smart card security standards. The operating range for this module can be adjusted in software from 1 to 20 meters. It is ideal for tollways and carparks but can be used also for train systems and retail stores or fastfood outlets. For the latter applications where the point of transaction is congested, the range of the reader is reduced to avoid false detection.

Figure 2B:
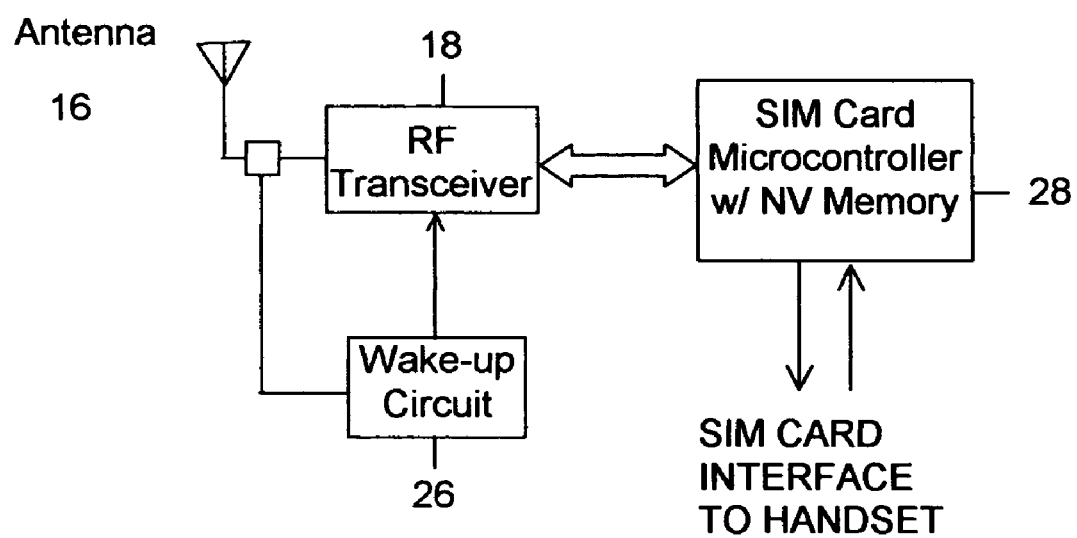
FIG. 2B is the Embedded Version and FIG. 2C is the Short Range Version

For the embedded version, the block diagram is shown in FIG. 2B. This module uses the battery of the handset so there is no need for its own battery. The microcontroller 28 is basically the same as the SIM Card microcontroller performing the standard GSM functions except that software routines are added to implement the automatic payment application. The monetary value is stored in the built-in non-volatile memory of the microcontroller 28. Since the RF transceiver 18 also consumes some power when not in use, the wake-up circuit is necessary to minimize consumption during idle conditions.

Figure 2C:
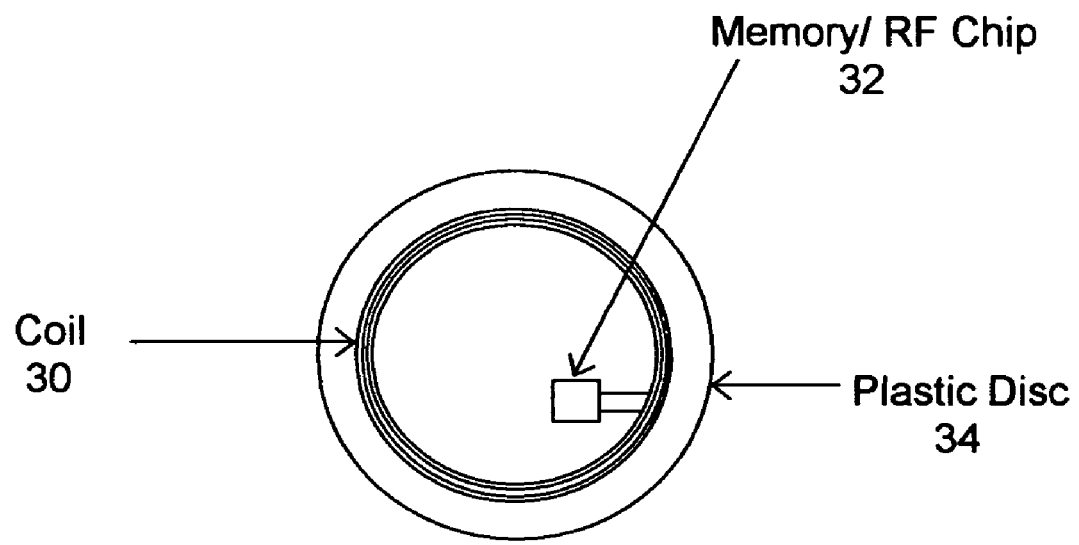

Another version of the module is a thin plastic disc 34 consisting of a coil 30 and memory/RF chip 32 that operates like contactless smart cards. This is shown in FIG. 2C. It conforms to ISO 14443 standards for contactless smart cards and is attached to the back of the cellphone. The reading range is limited to 5 cm. and is therefore ideal for mass transit systems, fastfood outlets, retail stores and similar applications where the customer has to place the cellphone 2 near a Reader 6.

Figure 3:
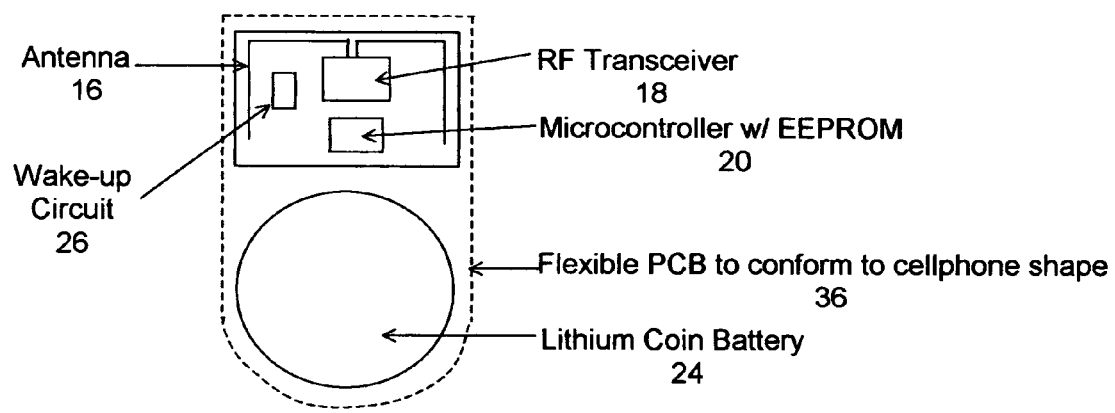
FIG. 3 is the RF Module Physical Configuration of the External Version

The RF module's physical configuration for the external version is illustrated in FIG. 3. The chips and passive components are mounted on a flexible PCB 36 together with the lithium coin battery 24. The flexible PCB 36 allows the module to conform to the shape of the cellphone's backside which varies from one model to another. The whole module is sealed and enclosed in a waterproof capsule following the shape of the cellphone's backside. It is designed for total replacement at the end of its battery life. The dimensions shown are approximate and can vary in the actual implementation.

Figure 4:
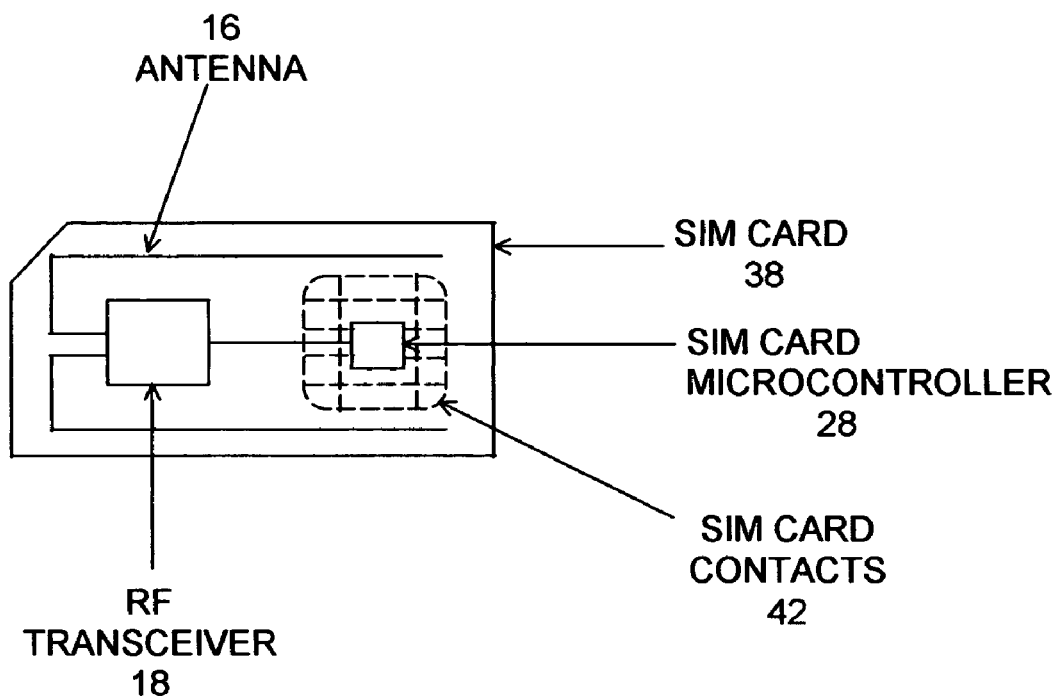
FIG. 4 is the RF Module Physical Configuration of the Embedded Version

FIG. 4 shows the physical configuration of the embedded version. The RF transceiver 18 is mounted on the SIM card 38 in chip form so it will fit within the SIM card's dimensions. The antenna 16 is in the form of copper traces around the card's perimeter while the SIM card microcontroller 28 is also in chip form, wire-bonded to the copper traces and SIM card contacts 42.

Figure 5:
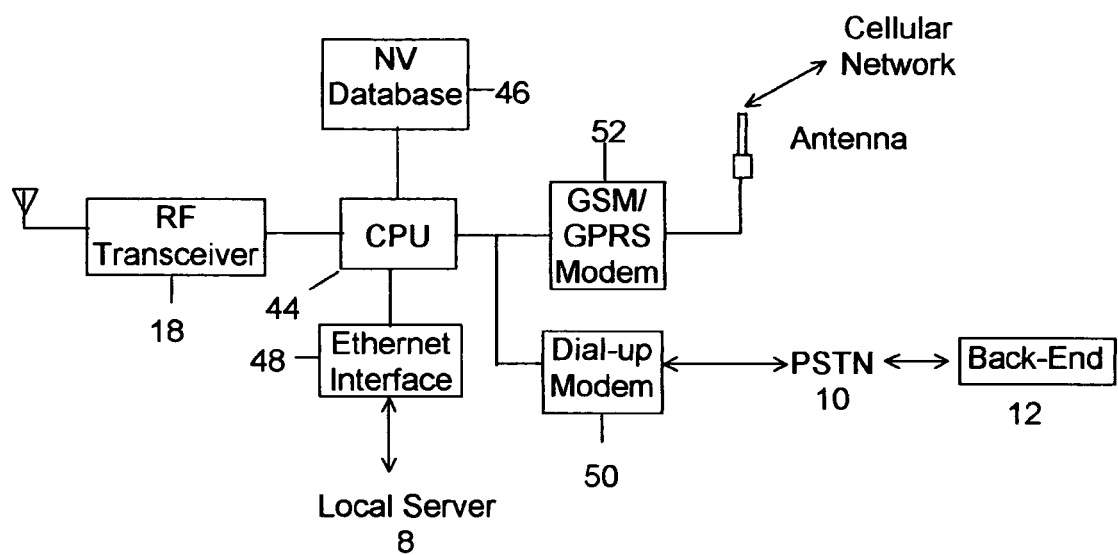
FIG. 5 is the Reader Block Diagram

The operation of the Reader 3 is depicted by the block diagram of FIG. 5. The data received by the RF transceiver 18 is sent to the CPU 44 which runs the Reader application. All the optional peripherals and interfaces are shown and will depend on the nature of the payment application. In a toll collection, carpark or mass transit application, there are several transaction points in one location so the Readers are networked to a local server 8 and only the Ethernet Interface 48 is needed on the Reader. The valid module database and modems are found in the server. In a stand-alone operation such as a bus fare payment or a retail point-of-sale application, the Reader should have its own non-volatile database 46 to keep the valid ID's and its own GSM/GPRS 52 or Dial-up modem 50 so it can update the Database at the Back-end facility 12.

Figure 6:
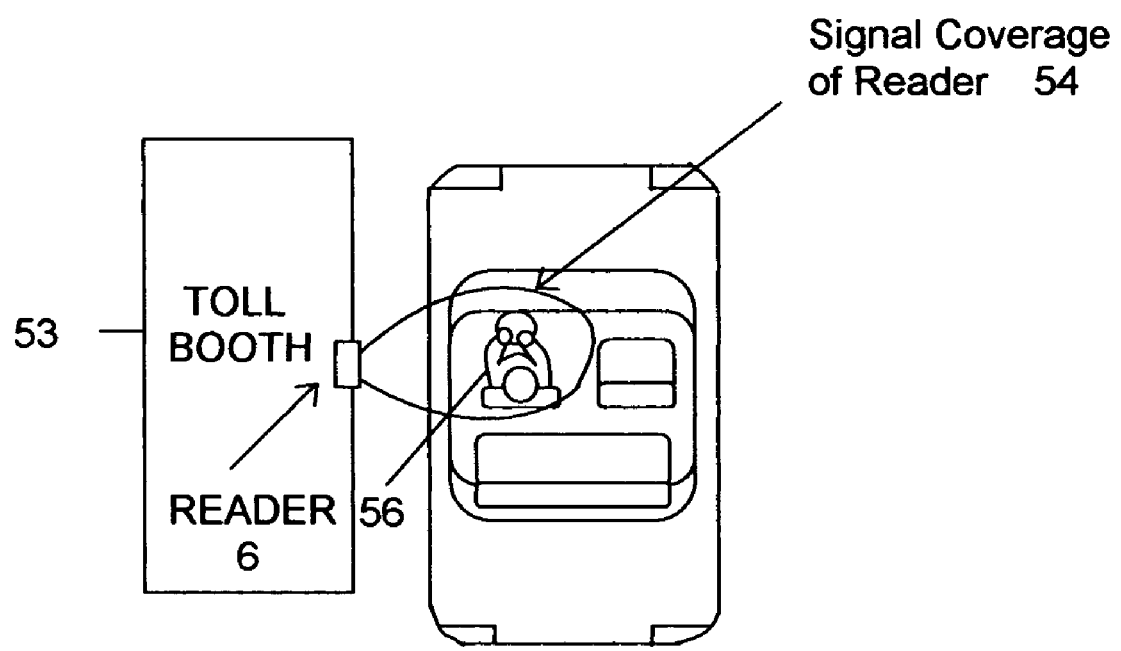
FIG. 6 shows the Signal Coverage of the Reader

To further illustrate the Reader operation, an example for a toll collection application is shown in FIG. 6. The Reader is mounted on the wall of the toll booth 53 at a level approximating that of the vehicle's driver 56. As the vehicle approaches the toll booth the RF signal from the Reader is detected by the wake-up circuit 26 of the module 4 and activates the microcontroller 20 and RF transceiver 18 of FIG. 2A. The directivity and radiation pattern of the Reader's RF signal are designed such that it is confined only to the driver's area inside the vehicle. This avoids the possibility of erroneously detecting other similarly equipped cellphones inside the vehicle or in other vehicles. The customer's cellphone can be inside his pocket, on the console box, on the door pocket or on the dashboard, as long as it is within the driver's range 54. The directionality is achieved by completely enclosing the Reader 6 with an aluminum shield and leaving an opening on the front side. The shield attenuates the RF signal from the rear and the sides and let's only the signal in front to pass through. The range is limited by setting the appropriate transmit power on the Reader's RF Transceiver 18.

Figure 7A:
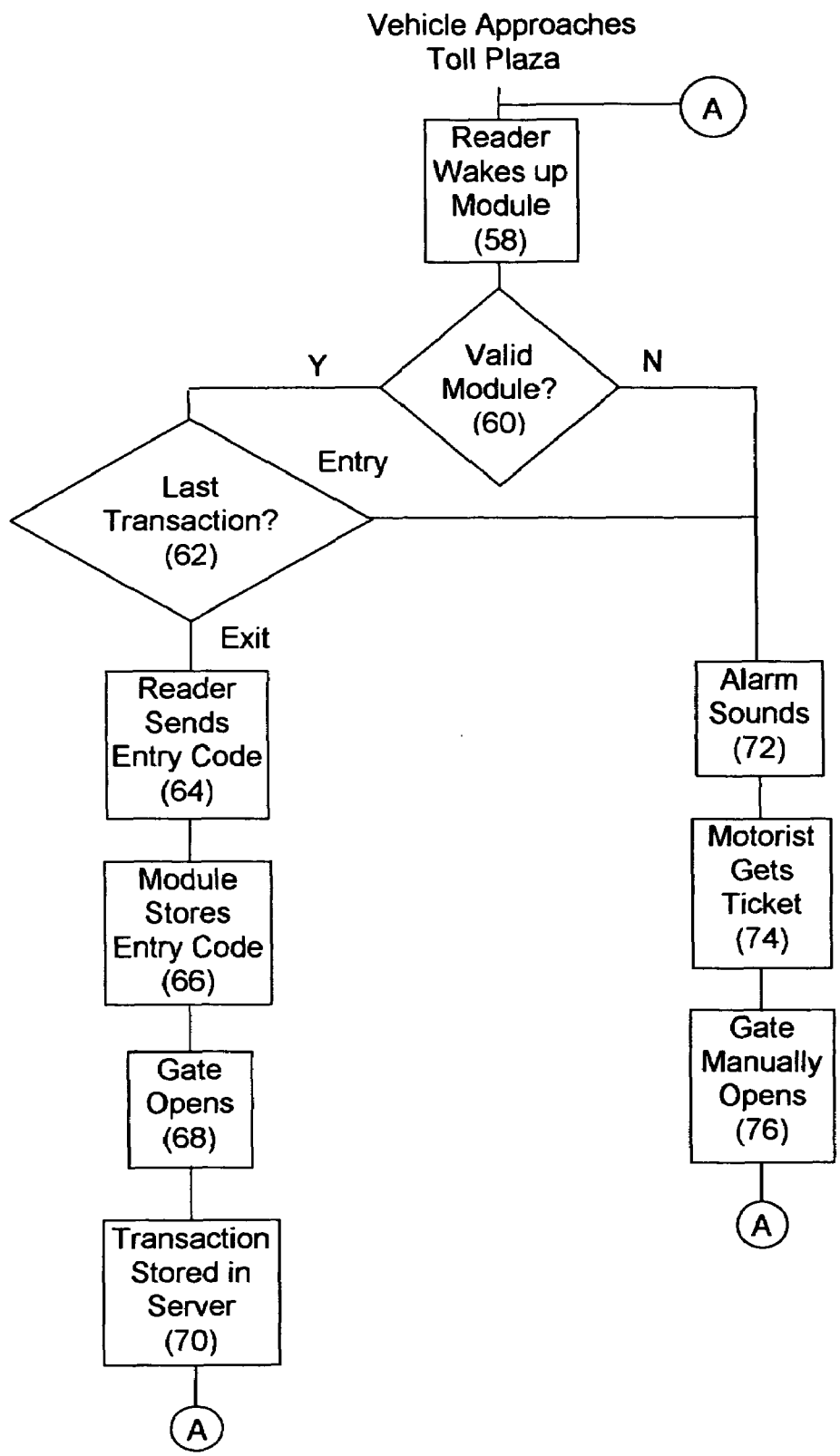
FIG. 7A is for the Toll Entry and FIG. 7B is for the Toll exit
Figure 7B:
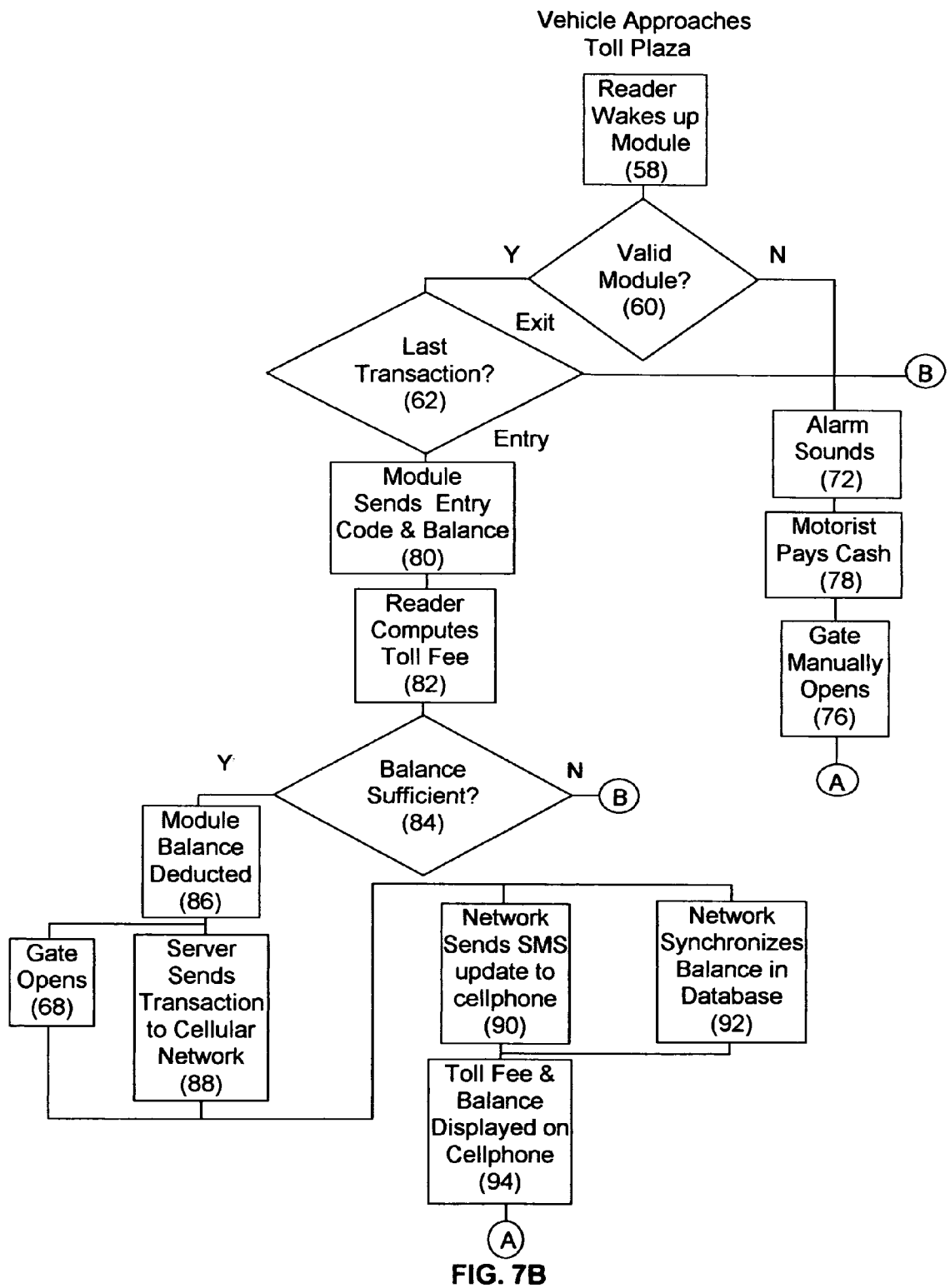

The process flow for a typical transaction for a toll collection application is shown in FIG. 7. At the toll entry (FIG. 7A) when a vehicle enters the toll lane, the Reader wakes up the module 58. Upon wake-up, the module sends a response to the Reader and an authentication/validation sequence follows. If the module is valid 60 then the Reader checks if the module's last transaction is an exit and not an entry 62. The Reader sends the entry code to the module 64 and this is stored in the module's memory 66. The gate then opens automatically 68 and the transaction is stored in the local server 70.

If the module is invalid or the last transaction is an entry, the alarm sounds 72, a supervisor approaches and a ticket is issued to the driver 56. The gate is manually opened 76 so the vehicle can enter the tollway.

At the toll exit (FIG. 7B), the initial process is similar to the toll entry. If the module is valid, the Reader asks for the toll entry code stored in its memory and the balance of its stored value 80. The Reader computes the toll fee based on the entry code 82 and the balance is checked if it's sufficient 84. If it is, the toll fee is deducted from the balance stored in the module 86, the barrier gate opens 68 and the transaction is stored in the local server and sent to the Cellular Network 88. The Network then sends a SMS advise to the customer's cellphone 90 and synchronizes the Back-end Database 92 with the module's balance. If the balance is insufficient, an alarm is generated 72 and the toll supervisor collects cash from the customer 78 and manually opens the gate 76 so the vehicle can exit.

Other transport applications, such as carparks and mass transit have similar transaction processing because they also involve entry and exit points. It is the method of fee computation that varies. For applications with single point of transactions, the process is simpler.

Figure 8:
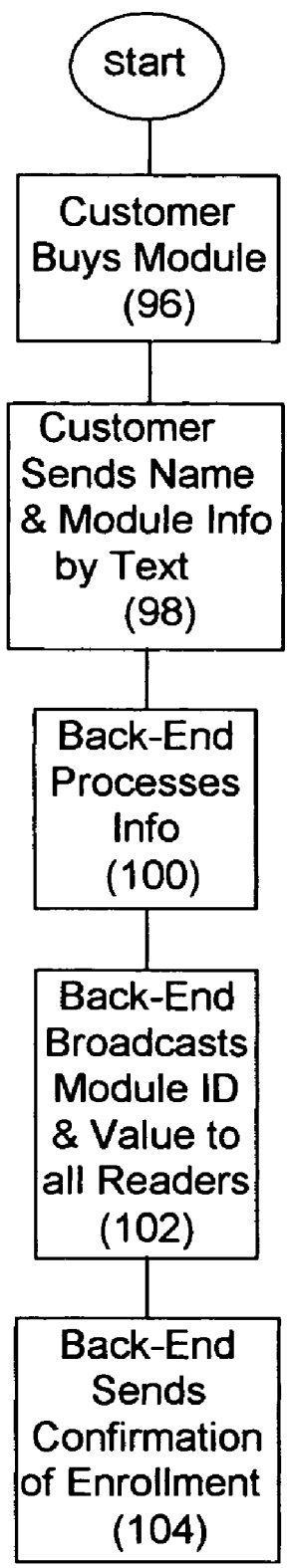
FIG. 8 is the Flow Chart for Enrolling a New Customer

FIG. 8 illustrates the procedure of enrolling a new customer in the Cellphone-based Automatic Payment System. The customer buys a Module 96 from the same outlets which also sells pre-paid cards and SIM cards for cellphones or from convenience stores, bookstores, gasoline stations, etc. The module already has an initial value stored in it. The customer then sends a text message to a special number consisting of his name, module serial no., and PIN (Personal Identity Number) 98. The PIN shall be used later for re-loading value into the module. The back-end then receives and processes the enrollment text message 100 after which it broadcasts the module serial no. and value to all Readers 102 deployed in the field. A text confirmation is then sent to the customer to inform him or her that the enrollment is successful and that the module can already be used for transactions 104. The first time the module is used it will be recognized because the new module information has already been sent to all the Readers in the field.

For re-loading the module, it can be done from various sources: from a prepaid card dedicated for the payment system; from the cellphone network's pre-paid card; from the customer's cellphone subscriber plan; from the customer's cell network electronic wallet system, from the customer's ATM account and from the customer's credit card. In all these methods, the procedure is the same: the customer sends a text message which contains all the information needed. For example, if loading from a pre-paid card, the pre-paid card serial number and PIN are entered. If loading from a subscriber plan, the name, account number and customer PIN are sent by text. Hence, the customer can re-load from anywhere without the need to go to a re-loading outlet or customer service center.

Figure 9:
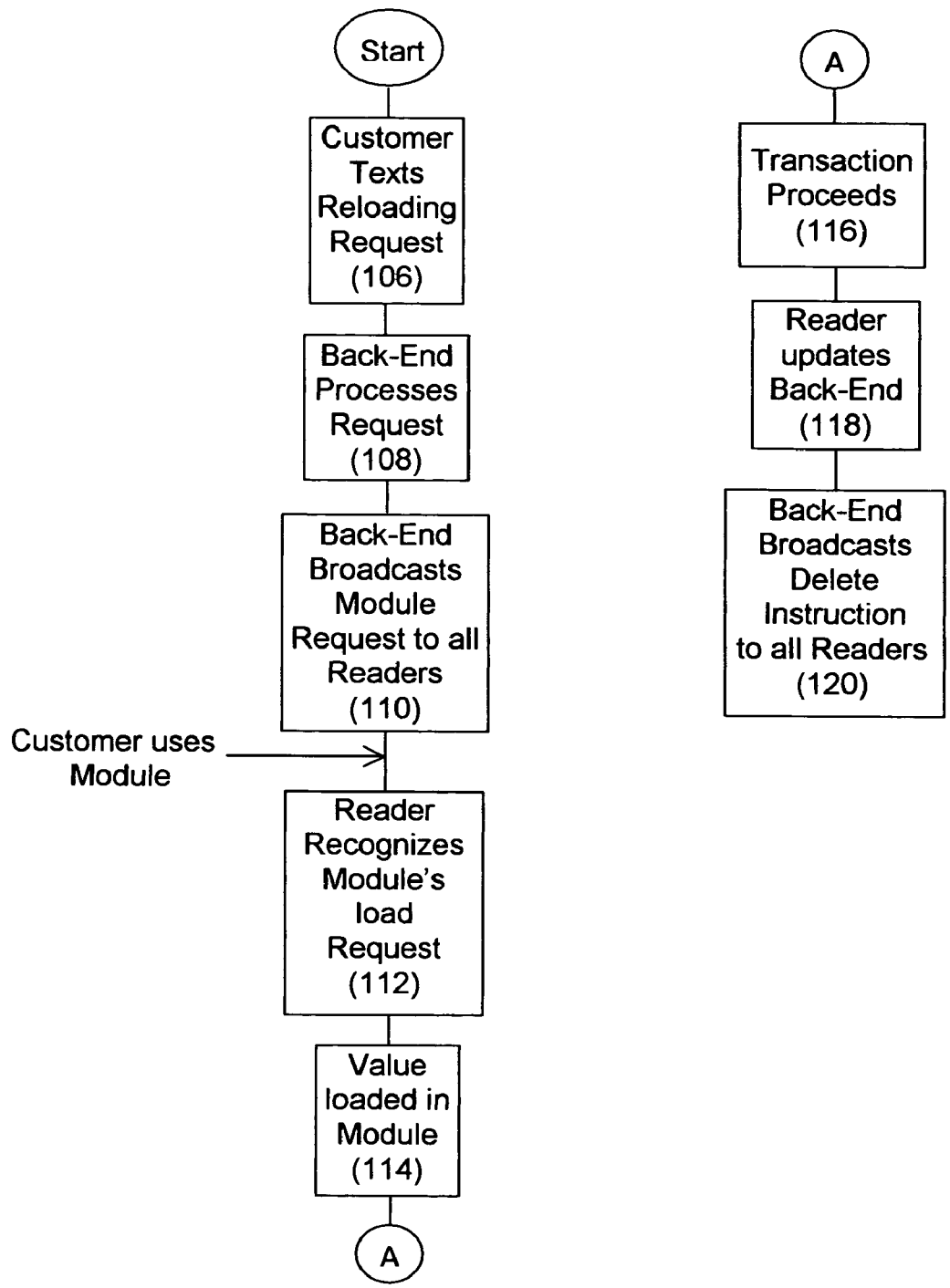
FIG. 9 is the Flow Chart for Re-loading a Module

The re-loading process is shown in FIG. 9. Once the request for re-loading is sent 106, the back-end facility will process it 108 after which it broadcasts the module serial number and amount for loading to all Readers in the field 110. A confirmation is then sent to the customer by text. At this point in time, the value is not yet loaded in the module's memory. When the customer uses it for the first time on any Reader, it is recognized by the Reader as a module that has a pending re-loading request 112. It then loads value on the module 114 before the current transaction is processed. This will appear to the customer just like any regular transaction 116. At this point, the Reader sends an update to the back-end 118 which in turn broadcasts a delete instruction to all the Readers in the field 120. This way, the module which has just been loaded shall not be erroneously re-loaded again.

The Readers shall be networked to the back-end using high speed data line connections or through GSM/GPRS for areas without any available data lines.

While the above description contains many specifities, these should not be construed as limitations on the scope of the invention, but rather an exemplification of one preferred embodiment thereof. Accordingly, the scope of the invention should be determined not by the embodiment illustrated, but by the appended claims and their legal equivalents.

What is claimed is:

1. An electronic payment system comprising:
   a radio frequency or RE module that has a monetary value stored in a non-volatile memory, said module being attached to a cellular phone without any electrical connection to the said cellular phone;
   a reading device or reader installed in a point of payment location which communicates with the said module and performs the functions of deducting a payment from a balance stored in the value to effect said payment and replenishing the monetary value stored in the module;
   a small computer acting as a local server that is networked to a plurality of readers that collects data from the readers;
   a wide area network which interconnects the local server to a central processing facility and a cellular phone network;

a central processing facility or back-end facility that collects and processes data from the readers situated in different locations and;

the cellular phone network which acts as a medium to exchange data between readers, servers and back-end;

whereby the said payment is deducted by the reader from the value stored in the RF module and transmitted to the central processing facility which processes said payment and sends the payment information to the cellular phone using the cellular phone network, with the value stored in the RF module being replenished by using the cellular phone to transmit request information which is sent to all the readers located in the points of payment.

2. The electronic payment system of claim 1, wherein the RF module is comprised of a microcontroller with non-volatile memory interfaced to a radio frequency transceiver chip powered by a battery and packaged into an encapsulated form for attaching to the back of the cellular phone, herein referred to as external long range module.

3. The electronic payment system of claim 1, wherein the RF module is comprised of a coil with a memory chip and an electromagnetic coupling device contained in a package small enough to be attached to the back of a cellular phone, herein referred to as external short range.

4. The electronic payment system of claim 1, wherein the reader is comprised of two radio frequency transceivers interfaced to a central processing unit that communicates with said RF module of claim 1, whereby one transceiver is used to communicate with the said external long range RF module and one transceiver is used to communicate with the said external short range RF modules.

5. A method of confirming the payment made in the system of claim 1, whereby the RF module and the reader captures a payment transaction and then sends the payment transaction to the back-end facility, after which said back-end facility sends a confirmation message to a user of the cellular phone to which the module is attached.

6. A method of re-loading monetary value into the RF module of claim 1 whereby the user of the cellular phone sends a text message instruction to the back-end facility to transfer value from an account of the user which is maintained with the cellular phone network.

7. The method of claim 6, further comprising of another step whereby after the request for re-loading is processed, the back-end facility communicates with all the readers in the various point-of-payment locations by sending a module identification number and the value to be loaded such that when the module is used on any reader, the reader recognizes that the module has a re-loading request and then performs the loading process by writing the new value to the module.

8. The method of claim 6, further comprising of another step whereby after the reader loads the value into the module, the reader sends a message to the back-end facility, which in turn, broadcasts a delete instruction to all the readers so that the re-loaded module will not be loaded again next time the module is used.

* * * * *